(12) United States Patent
Arbegast

(10) Patent No.: US 6,168,066 B1
(45) Date of Patent: Jan. 2, 2001

(54) FRICTION STIR CONDUCTION CONTROLLER

(75) Inventor: William John Arbegast, Carriere, MS (US)

(73) Assignee: Lockheed Martin Corp., New Orleans, LA (US)

( * ) Notice: Under 35 U.S.C. 154(b), the term of this patent shall be extended for 0 days.

(21) Appl. No.: 09/296,002

(22) Filed: Apr. 21, 1999

(51) Int. Cl.[7] ................................................. B23K 20/12
(52) U.S. Cl. ....................... 228/102; 228/103; 228/112.1; 228/234.1; 228/2.1
(58) Field of Search ................................... 228/102, 103, 228/8, 112.1, 2.1, 9, 10, 234.1

(56) References Cited

U.S. PATENT DOCUMENTS

| | | | |
|---|---|---|---|
| 4,234,777 | * 11/1980 | Balfanz | 219/125.1 |
| 4,510,587 | * 4/1985 | Schneider | 367/118 |
| 4,616,447 | * 10/1986 | Haas et al. | 51/59 |
| 5,211,327 | 5/1993 | Clarke et al. | 228/174 |
| 5,460,317 | 10/1995 | Thomas et al. | 228/112.1 |
| 5,495,090 | * 2/1996 | Mukai et al. | 219/124.34 |
| 5,585,733 | * 12/1996 | Paglione | 324/678 |
| 5,611,479 | 3/1997 | Rosen | 228/112.1 |
| 5,713,507 | 2/1998 | Holt et al. | 228/112.1 |
| 5,718,366 | 2/1998 | Colligan | 228/112.1 |
| 5,769,306 | 6/1998 | Colligan | 228/112.1 |
| 5,794,835 | 8/1998 | Colligan et al. | 28/2.1 |
| 5,813,592 | 9/1998 | Midling et al. | 228/112.1 |
| 5,829,664 | 11/1998 | Spinella et al. | 228/112.1 |
| 5,893,507 | * 4/1999 | Ding et al. | 228/2.1 |
| 6,032,083 | * 2/2000 | Oosawa | 700/218 |

OTHER PUBLICATIONS

Richard Wolfson, Physics. 1990. p. 649, 731, and 773.*

* cited by examiner

Primary Examiner—Patrick Ryan
Assistant Examiner—Jonathan Johnson
(74) Attorney, Agent, or Firm—W. H. Meise; T. G. Fierke

(57) ABSTRACT

A seam (16) between juxtaposed workpieces (14) is welded or heat-treated by friction-stir using a pin tool (12) driven by an apparatus (18) which controllably positions the pin tool (12) in the vertical direction (8). The workpiece (14) is supported by an anvil (22). The joint is heated by rotation of the pin tool (12) inserted into the joint from the obverse side. In order to provide a good weld through the thickness of the workpiece, a sensor (34, 310) senses electrical characteristics near the heated or welded region, and generates a control signal which tends to control the position of the pin tool near the reverse side of the weld. The sensor is located adjacent the weld (16s) on the obverse side, and is preferably protected by mounting in a depression (22c) in the anvil (22). In one embodiment, the sensor (34) senses magnetic characteristics near the weld. In another embodiment, the sensor (310) senses conduction, conductivity, or eddy currents in the vicinity of the weld.

12 Claims, 5 Drawing Sheets

FRICTION STIR CONDUCTION CONTROLLER

FIELD OF THE INVENTION

This invention relates to friction stir welding, and more particularly to controlling friction stir welders.

BACKGROUND OF THE INVENTION

Friction-stir heating or welding is a relatively new technique, which involves plunging a moving nonconsumable tool into the material to be heated or welded, as described in U.S. Pat. No. 5,460,317, issued Oct. 24, 1995 in the name of Thomas et al. The moving tool plasticizes portions of the workpiece immediately adjacent to the tool. An advantage of the friction-stir weld technique is that the material which is heated is not exposed to combustion products, which avoids chemical changes due to interactions of the workpiece with the fuel and its byproducts. Another advantage is that the heated regions tend to coalesce and solidify immediately upon removal of the tool. Also, the temperature of the workpiece, even in the heated region, tends not to be as high as that which may occur during conventional welding, which reduces oxidation of the workpiece due to ambient atmosphere, and this in turn results in a reduced need to provide an inert atmosphere at the weld location.

In the particular case of butt-welding of metal plates along juxtaposed sides to form a seam, the moving tool is a "pin" tool extending into the region between the plates. The plates are restrained from moving away from the rotating tool, but are not otherwise pressed toward each other, according to the Thomas et al. patent. Relative motion between the rotating tool and the joint to be welded is provided, as for example by moving the workpieces so that the rotating tool tracks along the joint.

It has been discovered, that producing a high-quality welded joint requires that the penetration of the pin tool into the joint region between the plates be precisely controlled. If the pin tool penetrates by only a small amount into the joint, only a portion of the joint will be heated and joined, and the weld will not have as much strength as if the weld penetrated fully through the joint region, from one face of the plates to the other. In addition to this lack of strength, the material will not be fully plasticized in the entire welded seam, so that a portion of the apparently welded region will be in the form of a lap weld. The lap weld is simply a region in which the material from one of the workpieces overlaps onto, but does not fully bond with, the material of the adjacent workpieces. The weakness of such a weld will not always be obvious.

One way to guarantee full welding is to make the pin penetrate far enough to extend beyond the reverse side of the plates being welded. In another arrangement, described in U.S. Pat. No. 5,718,366, issued Feb. 17, 1998 in the name of Colligan, the pin tool and the shoulder are connected by a spring, so that they are capable of relative movement. Consequently, the shoulder can be maintained in contact with the obverse or upper surface of the workpieces, while the tip of the pin tool is able to penetrate through to the reverse or lower side of the workpiece, to thereby guarantee a complete weld. This, however, raises the possibility of damaging the pin tool or the underlying anvil by contact therebetween. U.S. Pat. No. 5,769,306, issued Jun. 23, 1998 in the name of Colligan, describes an arrangement in which this problem is solved by supporting the workpieces being welded by a roller having a groove. Such a roller support, however, gives rise to the possibility of imparting an unwanted curvature to the welded plates.

It has been discovered that it is not necessary for the pin tool to extend beyond the lower surface of the joint in order to obtain a good weld; instead, it is only necessary for the tip of the rotating pin to lie within a particular distance (the ligament distance) from the reverse side of the plate, such that the heating effect results in satisfactory metallurgical changes on the reverse surface. An arrangement for tending to maintain precise depth of a rotating pin tool is described in U.S. patent application Ser. No. 09/006,915, filed Mar. 9, 1998 in the name of Gentry. The Gentry arrangement includes a set of adjustable rollers which rotate with the pin tool, and bear on the upper surface of the plates being welded. This has the advantage of tending to force the workpieces into uniform contact with the underlying anvil. Another arrangement for maintaining the pin tool penetration is described in U.S. patent application Ser. No. 09/249, 680, filed Feb. 12, 1999 in the name of Adams et al. In the Adams et al. arrangement, the pin tool is provided with a shoulder which bears against the upper surface of the workpieces, so that the forces required for maintaining the pin tool at a particular depth vary with the depth. A feedback arrangement senses the forces, and adjusts the drive to tend to maintain the shoulder in contact with the upper surface of the workpieces, which in turn tends to maintain a constant penetration of the pin tool into the joint.

Improved pin tool penetration control is desired.

SUMMARY OF THE INVENTION

A method for welding or heating a seam between two workpieces according to an aspect of the invention includes the steps of rotating a friction-stir weld pin tool, and plunging the pin tool to a depth in the seam under the control of a control signal. The electrical or magnetic characteristics (or both) across the seam is sensed to produce a conductivity or magnetic value signal. In one embodiment, the conductivity or magnetic value signal is compared with a standard value representing the sensed electrical conductivity or magnetic characteristic of a properly welded seam of the same material. The difference is taken between the conductivity or magnetic value and the standard value to produce the control signal. In a preferred mode of practicing the method of the invention, the step of sensing the electrical conductivity or magnetic characteristic is performed in a noncontacting manner. In a most preferred mode, the step of sensing the electrical conductivity is performed by applying alternating signals to a first winding located adjacent the seam, sensing the alternating signals received by a second winding coupled to the first winding, and processing the sensed signals to generate the conductivity value signal. In one version of the mode, the step of sensing the electrical conductivity is performed by using a meandering winding magnetometer.

A friction-stir welding or heating apparatus according to an aspect of the invention, for welding at least a portion of an elongated seam between juxtaposed workpieces, includes a friction-stir pin tool, and also includes a mounting, positioning and rotation arrangement coupled to the pin tool, (a) for holding the pin tool, (b) for rotating the pin tool about an axis, and (c) for controlling the position of the pin tool in the direction of the axis in response to a control signal. An anvil is provided for supporting the juxtaposed workpieces. The workpieces are supported in a manner which tends to maintain a portion of the seam on the axis. A seam conductivity or magnetic sensing arrangement is located adjacent the seam, for producing a first signal representing the conductivity or magnetic characteristics of at least that portion of the seam near the axis. A signal processing arrangement is coupled to the sensing arrangement and to the mounting, positioning and rotation arrangement, for comparing the first signal with a standard signal representing the desired conductivity or magnetic characteristic of the seam, and for generating the control signal in response to the difference between the first and standard signals. The apparatus also includes a coupling arrangement for coupling the control signal from the signal processing arrangement to the mounting, positioning and rotation arrangement, for controlling the positioning of the pin tool so as to tend to maintain the desired conductivity.

In a particular embodiment of the apparatus, an arrangement is provided for generating relative motion between the anvil and the pin tool along, or in the direction of elongation of the joint or seam.

BRIEF DESCRIPTION OF THE DRAWING

FIG. 1b is a cross-section of the arrangement of FIG. 1a looking in the direction of section lines 1a—1a, and FIG. 1c is a simplified block-diagram representation of a portion of the control system for generating the control signal which controls the arrangement of FIG. 1a;

DESCRIPTION OF THE INVENTION

Figure 1A:
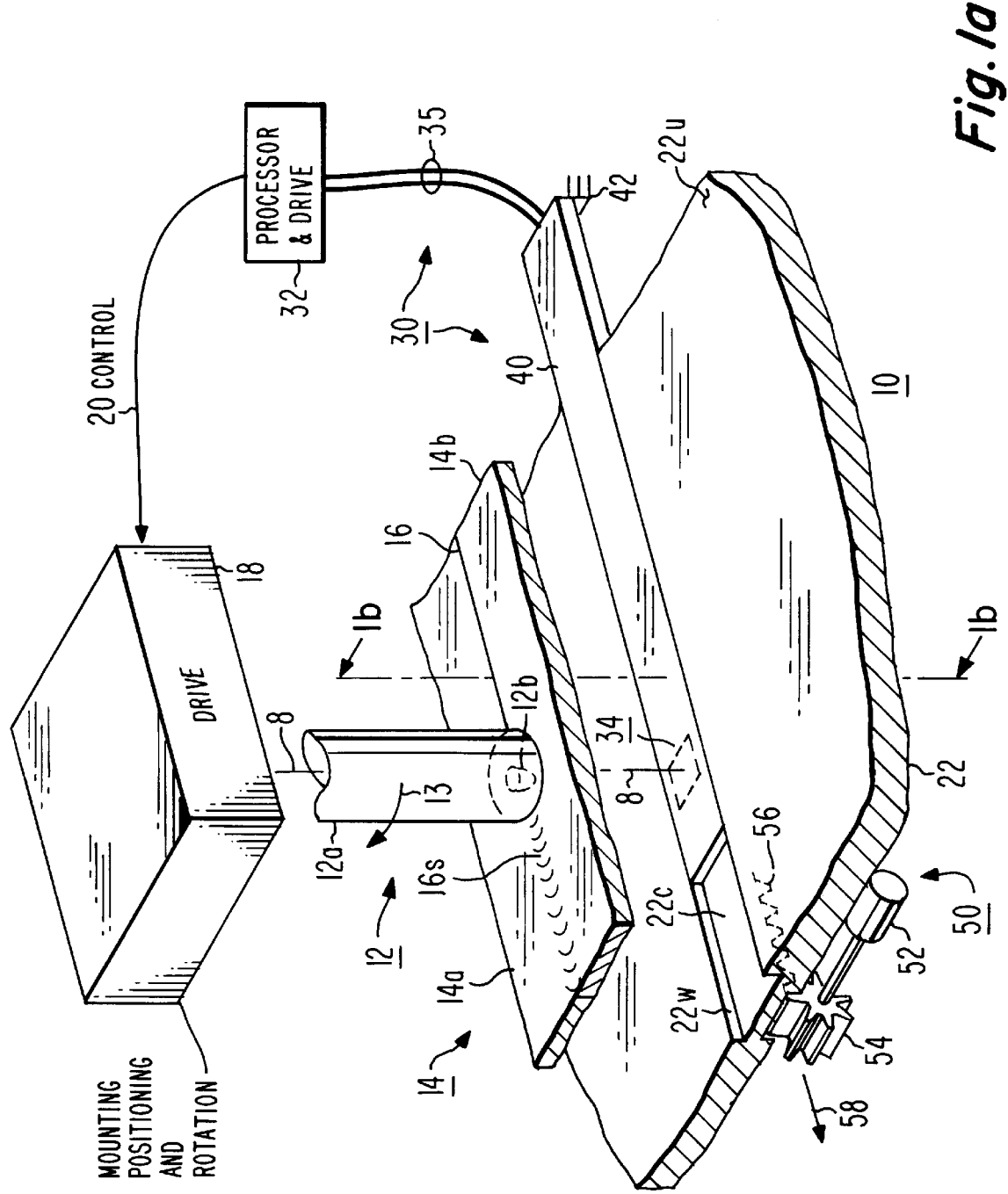
FIG. 1a is a simplified, partially exploded diagram representing an arrangement according to an aspect of the invention, in which a sensor is used to sense the magnetic characteristics in the region of the weld being made, and in which the sensed characteristics are used to control the depth of penetration.
Figure 1B:
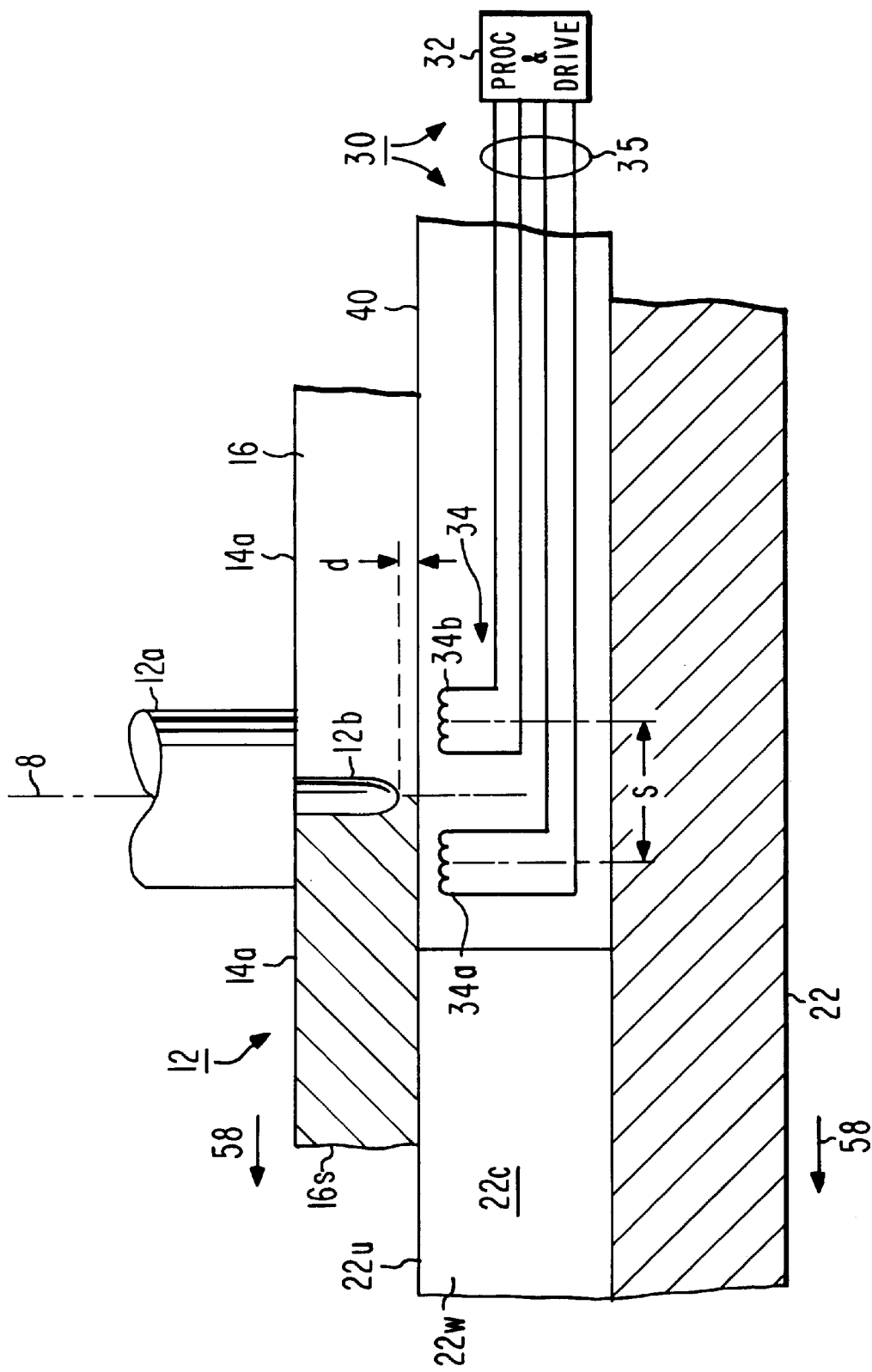
Figure 1C:
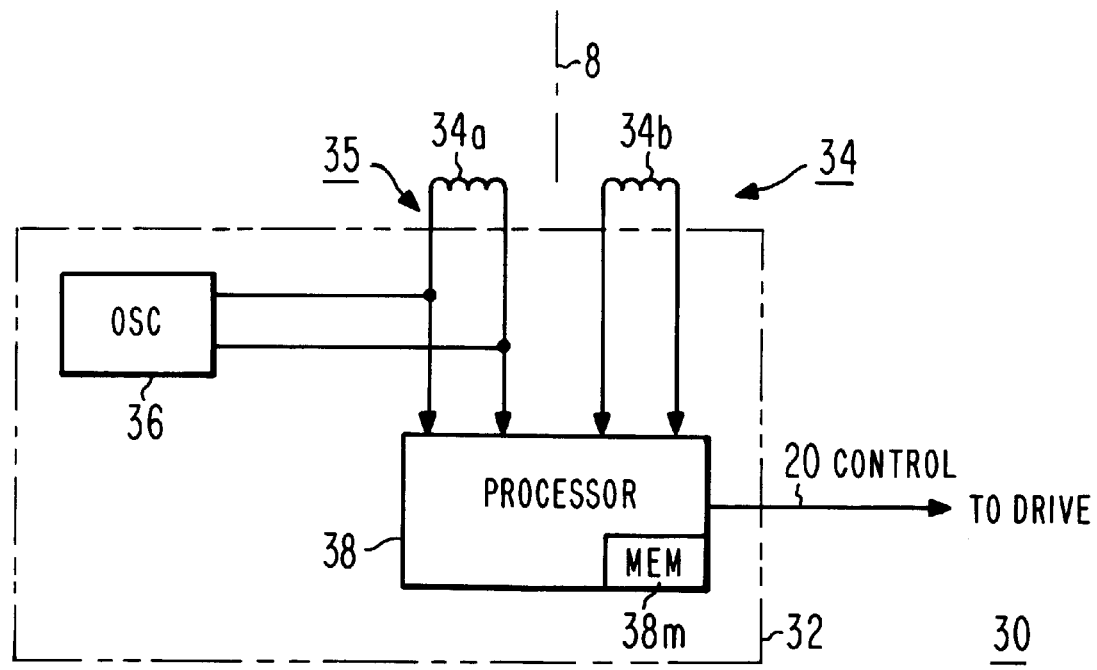

In FIGS. 1a, 1b, and 1c, a welding or heat-working arrangement designated generally as 10 includes a pin tool designated generally as 12. Pin tool 12 includes a portion 12a having a shoulder 12s, and also includes a pin 12b. A mounting, positioning, and rotating arrangement, illustrated generally as a box 18, holds the pin tool 12, rotates it in the direction of arrow 13 about its axis 8, and also positions the pin tool 12 in a direction parallel with axis 8 in response to control signals applied over a signal path 20. More particularly, as illustrated in FIGS. 1a and 1b, mounting, positioning, and rotation block 18 controls the vertical position of pin tool 12.

The pin portion 12b of pin tool 12 of FIGS. 1a and 1b extends into the junction or juncture 16 between fayed or juxtaposed plates 14a and 14b, which are the workpieces which are to be welded into a continuous plate along a seam. The seam is illustrated in FIGS. 1a and 1b as region 16s. The workpiece plates 14a and 14b of FIGS. 1a and 1b are at least partially supported during welding by an anvil designated 22 having a flat upper surface 22u. Anvil 22 has a central groove or depressed channel designated 22c, which has a rectangular cross-section defined, in part, by a wall 22w. Anvil 22 is propelled by a drive arrangement designated generally as 50, which includes a motor 52 driving a spur gear 54. Spur gear 54 engages a gear rack 56 extending along the lower surface of anvil 22, parallel to channel 22c. In operation, drive arrangement 50 drives the anvil in the direction of arrow 58, which is to the left in FIGS. 1a and 1b. As a result of the driving of anvil 22 to the left during operation of drive arrangement 50, the workpiece plates 14a and 14b are also carried in the direction of arrow 58. The motion of the anvil 22 and the workpiece plates 14a and 14b has the effect of moving the region of contact between the rotating pin tool 12 along juncture 16 between the plates, thereby extending the welded or heat-treated region 16s along the length of the juxtaposed plates.

According to an aspect of the invention, a sensor support arrangement illustrated as a structure 40 lies in channel 22c. The purpose of sensor support arrangement 40 is to hold the sensor element 34 of a sensor arrangement 30 in a fixed position under the rotating pin tool 12, and preferably centered on axis 8. For this purpose, the sensor support structure 40 is fixed in position relative to the moving anvil 22, as suggested by the symbolic ground symbol 42.

The sensor arrangement 30 includes sensor 34 associated with sensor support arrangement 40, illustrated in more detail in conjunction with FIG. 1b. As illustrated in FIG. 1b, the sensor 34 includes a pair of windings or coils 34a and 34b which are somewhat magnetically decoupled from each other, as for example by providing a spacing S therebetween as illustrated, or possibly by relatively skewing their respective magnetic axes, or in some other manner. The windings 34a and 34b are located within sensor support structure 40 at a location in which the coils are symmetrically located relative to axis 8. Windings 34a and 34b are electrically coupled or connected by a path designated generally as 35 to a processing and drive arrangement 32, which includes all of the electronics for (if necessary) driving the sensor 34, for extracting and processing the sensed signals, and for generating the control signals by which the mounting, positioning, and rotation drive arrangement 18 controls the vertical position of the pin tool 12. As detailed in FIG. 1c, a signal source or oscillator 36 is coupled to coil 34a, and a sample of the oscillator drive is coupled to a processor illustrated as 38. Processor 38 is associated with a memory designated 38m. The output of processor 38 is the desired control signal, which is applied over signal path 20 to control the vertical position of the pin tool by control of the drive apparatus 18.

Figure 2A:
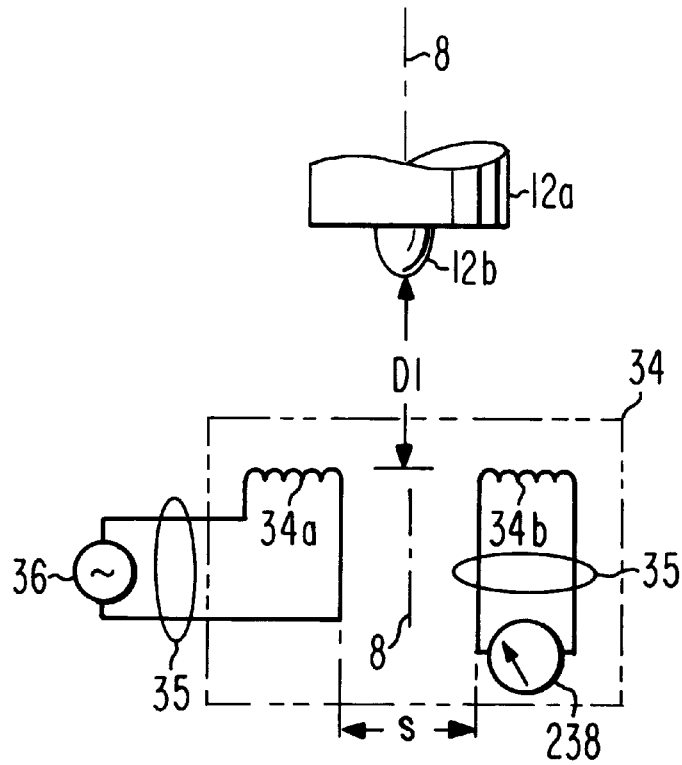
FIGS. 2a, 2b, and 2c represent a portion of sensor arrangement 30, for positions of the pin tool relatively (a) far from, (b) at an intermediate distance from, and (c) near, respectively, relative to the sensor 34, together with an indication of the relative coupling.
Figure 2B:
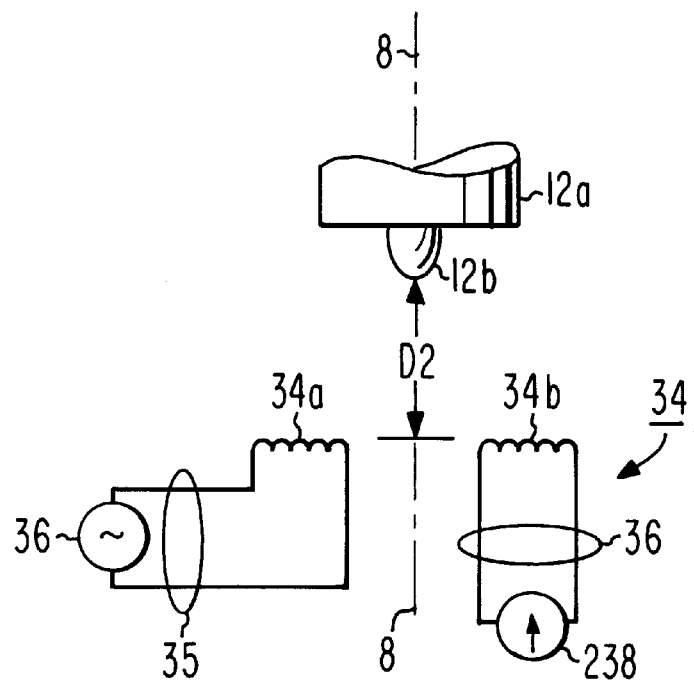
Figure 2C:
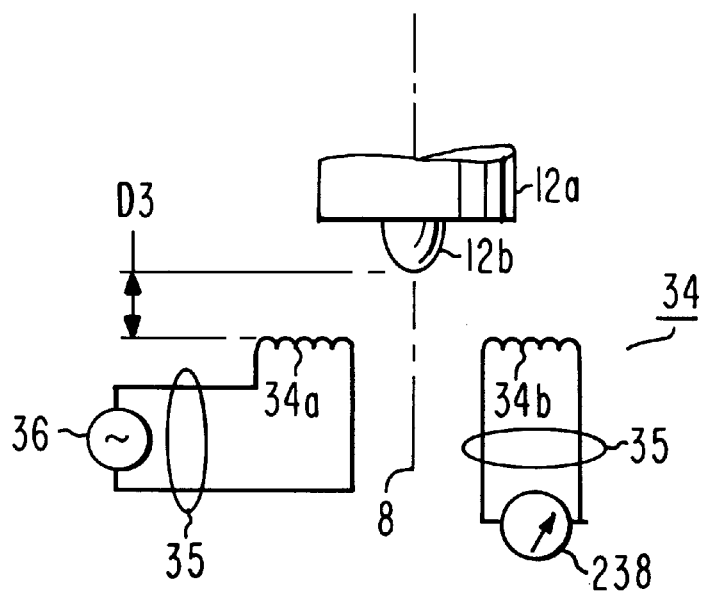

FIGS. 2a, 2b, and 2c represent a portion of sensor arrangement 30, for positions of the pin tool relatively (a) far from, (b) at an intermediate distance from, and (c) near, respectively, relative to the sensor 34, together with an indication of the relative coupling. FIG. 2a represents a location of the pin tool far distant from the sensor 34, at a distance D1 such that it has essentially no effect on the coupling between the windings. Electrical signal produced by oscillator 36 and applied to winding 34a is coupled at some amplitude to winding 34b. This value of coupling or signal amplitude may be considered to represent a reference value, and is represented on an indicator 238 as a low value (arrow pointing somewhat left of center). FIG. 2c represents a condition in which the pin tool is near its closest approach to the sensor 34, represented as a distance D3. The steel pin tool has a magnetic influence which tends to increase the coupling between windings 34a and 34b, so that a maximum amount of signal originating from oscillator 36 is coupled to winding 34b. This maximum amount is represented in FIG. 2c by a position of the arrow of indicator 238 to the right of center. FIG. 2b represents a condition in which the pin tool is at an intermediate distance D2 from the sensor 34. Under this condition, the amount of signal coupled from winding 34a to winding 34b is intermediate between the maximum and minimum values, and is represented by a centered arrow in indicator 238.

Processor 38 of FIG. 1c stores a reference value of coupling in memory 38m. The reference value might be, for example, the value of coupling which occurs when distance D3 of FIG. 2c equals the desired ligament d. The value of coupling is simply the signal received at winding 34b if oscillator 36 can be relied upon to produce a constant drive to winding 34a, or the value of coupling may be the attenuation or difference between the oscillator signal and the signal from winding 34b, which should be independent of oscillator output signal. The attenuation is inversely related to the signal level picked up by winding 34b. For welding aluminum-copper-lithium sheets having a thickness of about 0.032", a desirable range for the ligament distance d has been found to be 0.003" to 0.010," and more particularly the range from about 0.003" to 0.005." Thus, setting the reference condition requires only placing the pin tool at distance d of FIG. 1a, and measuring the attenuation between the oscillator and winding 34b signals. This value is stored in memory 38m for later use.

In operation of the arrangement depicted in FIGS. 1a, 1b, and 1c, processor 38 merely compares the magnitude of the oscillator signal with the amplitude of the corresponding signal picked up by winding 34b, and determines whether the ratio is greater than the corresponding ratio stored in memory. If the attenuation is greater than that stored in memory, the signal level is too low, and the pin tool must be too distant from the sensor 34. Processor 38 produces a control signal (an "error' signal in control-system terminology) which tends to cause drive block 18 to drive the pin tool 12 further into the workpiece, thereby tending to correct the excessive distance, in known feedback fashion. Similarly, if the attenuation decreases relative to the stored attenuation, the pin tool is "too close." Processor 38 in that case performs a comparison with the stored value of attenuation, and produces a control signal having the effect of tending to drive the pin tool relatively away from the sensor 34, thereby tending to correct the error. Consequently, the described arrangement tends to maintain the tip of the pin tool 12 at a fixed distance from the sensor 34, regardless of environmental conditions.

An advantage of the described arrangement is that the ligament distance can be changed easily by simply resetting the value stored in memory, which changes the sensed distance to which the feedback system tends to control. Another advantage is that the ligament distance tends to remain constant, even if the thickness of the workpieces being welded changes across the weld, or from workpiece to workpiece.

If the sensor is distributed, it may be affixed to the moving anvil, and will not require an arrangement such as holder 40 to maintain the sensor at a fixed location. According to a further embodiment of the invention, a distributed or elongated "Meandering Winding Magnetometer," (MWM) is used. These sensors are available from Jentek Sensors, Inc., the address of which is 200 Dexter Avenue, Watertown, Mass. 02472. These sensors are made up of arrayable cells, and produce sensed signal regardless of the location along the array length at which an anomaly occurs; the sensing of an anomaly is believed to relate to eddy currents andor electrical conductivity in the region near the sensor. At the present state of the art, MWM sensors are relatively short, having length of only a few inches, but there is no reason in principle that they cannot be made with lengths of tens or hundreds of feet.

Figure 3:
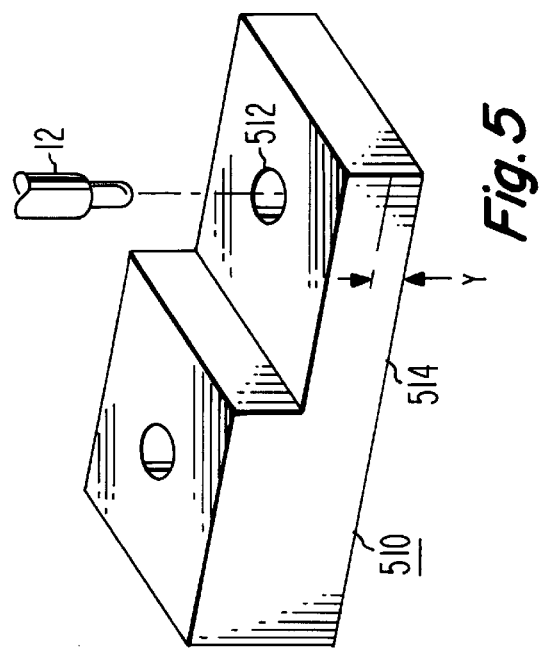
FIG. 3 is a simplified, partially exploded representation of an anvil portion similar to that of FIG. 1b, in which the sensor is a meandering-winding magnetometer.

The MWM sensor in a preferred embodiment of the invention is, for mechanical protection, located in a channel 22c, similar to channel 22c of FIG. 1a. As illustrated in FIG. 3, the array 310 of sensor cells 312 extends along at least a portion of the length of channel 22c. For protection of the MWM sensor array 310 of FIG. 3, a ceramic bearing plate 314 may be placed over the channel 22c. Ceramic is used for the bearing plate so as not to disrupt the magnetic or conductive sensing of the sensor array, and to provide relatively high strength at elevated temperatures, as may be encountered in welding. A cable trough or channel 322c may be formed or defined in channel 22c to accommodate the wiring 324 for sensor array 310.

Figure 4:
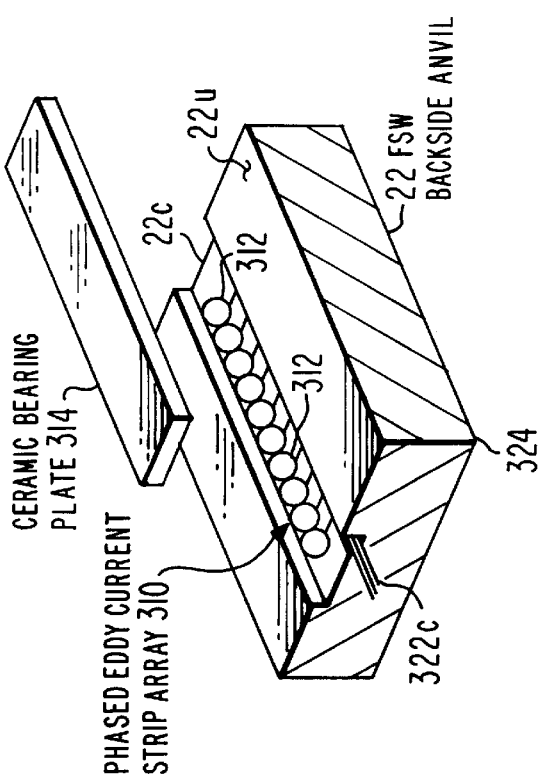
FIG. 4 is a simplified, partially exploded representation of the magnetometer of FIG. 3 encased in a protective body.

As an alternative to use of a bare sensor array 310 placed in the bottom of channel 22c as illustrated in FIG. 3, the sensor may itself be embedded in a ceramic body, as suggested in FIG. 4. In FIG. 4, the array 310 is encased within the upper section 410u and lower section 410l of a ceramic body 410, but with its connecting leads 324 projecting from the encasement. The body 410 desirably has dimensions selected to fit closely within the channel 22c, with its upper surface 419uu flush with the upper surface 22u of anvil 22. The flush upper surface provided by ceramic plate 314 of FIG. 3 or ceramic body 410 provides a continuous flat surface across the entire anvil 22, which aids in keeping the workpieces from warping or bending during welding.

Figure 5:
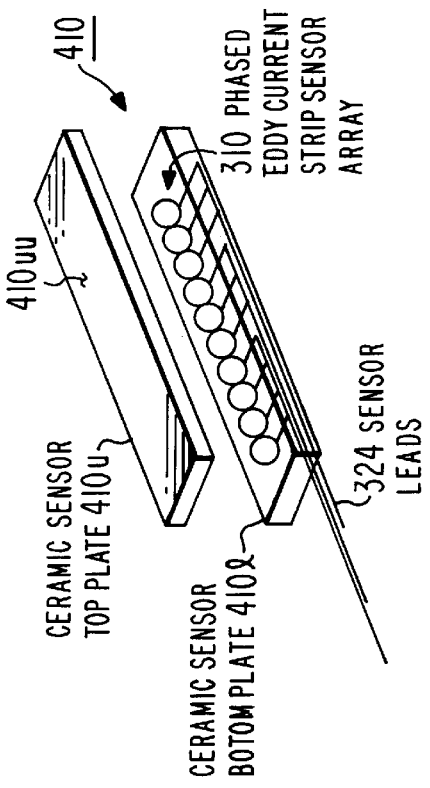
FIG. 5 is a simplified perspective or isometric view of a calibration tool which may be used with a method according to an aspect of the invention.

A preferred method for calibrating the welding system according to an aspect of the invention is to prepare a test workpiece 510 such as that illustrated in FIG. 5, having a brinelled (pressed by a hard object) hemispherical depression 512 dimensioned to accommodate the pin tool 12 (or an object having like characteristics) at a fixed distance or dimension, such as dimension Y, from a lower surface 514. The lower surface 514 is placed on the anvil straddling the sensor, and with the pin tool or pin-tool-like object in the brinelled depression 512. The sensor signal under this condition is set as the memorized standard, or at least used to set the standard. A calibration block 510 may include a plurality of calibration apertures, such as by addition of aperture or depression 516, to provide plural calibration distances.

Other embodiments of the invention will be apparent to those skilled in the art. While the invention has been described in the context of the welding of metal workpieces, it may be used with any kind of material in which the conductivity changes in response to heating. While axis 8 has been assumed to be vertical, it may in principle be in any position. While the description has been couched in terms of welding, those skilled in the art know that the term "heat-treating" could be substituted for welding.

Thus, a method for welding a seam (16) between two workpieces (14) according to an aspect of the invention includes the steps of rotating a friction-stir weld pin tool (12), and plunging the pin tool (12a) to a depth in the seam (16) under the control of a control signal (on path 20). At least one of the magnetic coupling, electrical conductivity, and eddy currents across, or in the vicinity of the seam (16) is or are sensed to produce an anomaly value signal. The anomaly value signal is compared with a standard value representing the sensed electrical anomaly of a properly welded seam (16) of the same material. The difference is taken between the anomaly value and the standard value to at least aid in producing the control signal. In a preferred mode of practicing the method of the invention, the step of sensing the electrical anomaly is performed in a noncontacting manner. In a most preferred mode, the step of sensing the electrical anomaly is performed by applying alternating signals to a first winding located adjacent the seam (16), sensing the alternating signals received by a second winding coupled to the first winding, and processing the sensed signals to generate the anomaly value signal. In another most preferred mode, the step of sensing the electrical anomaly is performed by using a meandering winding magnetometer.

A friction-stir welding apparatus (10) according to an aspect of the invention, for welding at least a portion of an elongated seam (16) between juxtaposed workpieces (14), includes a friction-stir pin tool (12a), and also includes a mounting, positioning, and rotation arrangement (18) coupled to the pin tool (12a), (a) for holding the pin tool (12a), (b) for rotating the pin tool (12a) about an axis (8), and (c) for controlling the position of the pin tool (12a) in the direction of the axis (8) in response to a control signal (on path 20). An anvil (22) is provided for supporting the juxtaposed workpieces (14). The workpieces (14) are supported in a manner which tends to maintain a portion of the seam (16) on the axis (8). A seam (16) electrical or magnetic characteristic sensing arrangement (30; 310) is located adjacent the seam (16), for producing a first signal representing the characteristic of at least that portion of the seam (16) near the axis (8). A signal processing arrangement (38) is coupled to the sensing arrangement (30; 310) and to the mounting, positioning, and rotation arrangement (18), for comparing the first signal with a standard signal (in memory 38m) representing the desired characteristic of the seam (16), and for generating the control signal in response to the difference between the first and standard signals. The apparatus (10) also includes a coupling arrangement (20) for coupling the control signal from the signal processing arrangement (38) to the mounting, positioning, and rotation arrangement (18), for controlling the positioning of the pin tool (12a) so as to tend to maintain the desired characteristic. In one embodiment of the invention, the anomaly characteristic is the magnetic coupling associated with proximity of the pin tool (12b), and in another embodiment, the characteristic is the conductivity of the seam or the eddy currents in the region of the seam.

In a particular embodiment of the apparatus (10), an arrangement (50) is provided for generating relative motion between the anvil (22) and the pin tool (12a) along, or in the direction (58) of elongation of the joint or seam (16).

What is claimed is:

1. A method for welding a seam between two workpieces, said method comprising the steps of:
    rotating a friction-stir weld pin tool;
    plunging said pin tool to a depth in said seam under the control of a control signal, whereby said rotation of said pin tool heats said seam in a region adjacent said pin tool;
    sensing an electrical anomaly in the vicinity of said seam to produce an anomaly value, where said electrical anomaly is associated with changes in the electrical characteristics of said seam attributable to the presence of at least one of said pin tool and said heating;
    comparing said anomaly value with a standard value representing the sensed anomaly value of a properly welded seam of the same material; and
    taking the difference between said anomaly value and said standard value to produce said control signal.

2. A method according to claim 1, wherein said step of sensing the electrical anomaly is performed in a noncontacting manner.

3. A method according to claim 2, wherein said step of sensing the electrical anomaly is performed by applying alternating signals to a first winding located adjacent said seam;
    sensing the alternating signals received by a second winding coupled to said first winding by a path including said seam; and
    processing said sensed signals to determine said anomaly value.

4. A method according to claim 1, wherein said step of sensing said electrical anomaly is performed by using a meandering winding magnetometer.

5. A method according to claim 1, wherein said electrical anomaly includes a magnetic coupling anomaly.

6. A method according to claim 1, wherein said electrical anomaly includes an electrical conductivity anomaly.

7. A method according to claim 1, wherein said electrical anomaly includes an eddy current anomaly.

8. A friction-stir welding apparatus for welding at least a portion of an elongated seam between juxtaposed workpieces, said apparatus comprising:
    a friction-stir pin tool;
    mounting, positioning and rotation means coupled to said pin tool, for holding said pin tool, for rotating said pin tool about an axis, and for controlling the position of said pin tool in the direction of said axis in response to a control signal:
    an anvil for supporting said juxtaposed workpieces with a portion of said seam on said axis;
    a seam anomaly sensing arrangement located adjacent said seam, for producing a first signal representing the magnitude of an electrical anomaly of at least that portion of said seam near said axis which is heated by said rotating pin tool;
    signal processing means coupled to said sensing arrangement and to said mounting, positioning and rotation means, for comparing said first signal with a standard signal representing the desired anomaly value of said seam, and for generating said control signal in response to the difference between said first and standard signals; and
    means for coupling said control signal from said signal processing means to said mounting, positioning and rotation means, for controlling the positioning of said pin tool so as to tend to maintain said desired anomaly value.

9. An apparatus according to claim 8, wherein said seam anomaly is electrical conductivity across said seam.

10. An apparatus according to claim 8, wherein said seam anomaly is magnetic coupling in the vicinity of said seam.

11. An apparatus according to claim 8, wherein said seam anomaly includes eddy currents in the vicinity of said seam.

12. An apparatus according to claim 8, further comprising means for generating relative motion between said anvil and said pin tool along said seam.

* * * * *